June 13, 1950 C. R. MINER 2,511,665

HUM ELIMINATING CIRCUIT FOR PHONOGRAPH PICKUPS

Filed Jan. 30, 1947

Inventor:
Carroll R. Miner,
by Merton D. Moore
His Attorney.

Patented June 13, 1950 2,511,665

UNITED STATES PATENT OFFICE 2,511,665

HUM ELIMINATING CIRCUIT FOR PHONOGRAPH PICKUPS

Carroll R. Miner, Stratford, Conn., assignor to General Electric Company, a corporation of New York Application January 30, 1947, Serial No. 725,340

2 Claims. (Cl. 179—100.4)

My invention relates to current supply circuits for phonograph pickups and the like and particularly to a hum eliminating circuit for pickups of the variable resistance type.

Pickups of the variable resistance type require direct current excitation which is normally available from the power supply rectifier for energizing the electron discharge devices employed in the amplifying circuits. It is difficult to eliminate entirely the alternating current component present in the rectified current employed for amplifier excitation. Various forms of filters have been employed; however, when it becomes necessary to practically eliminate the hum, as in the case of the resistance type pickup, the large filters required are expensive and occupy considerable space. Accordingly, it is an object of my invention to provide an arrangement for preventing the production of hum in phonograph pickups caused by the ripple voltage or A.-C. component in the direct current supply.

It is another object of my invention to provide an improved hum balancing circuit for sound reproducing apparatus, such as phonograph pickups of the variable resistance type.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents a phonograph pickup of the variable resistance type, and Fig. 2 represents diagrammatically a hum balancing circuit embodying my invention applied to the pickup of Fig. 1.

Figure 1:
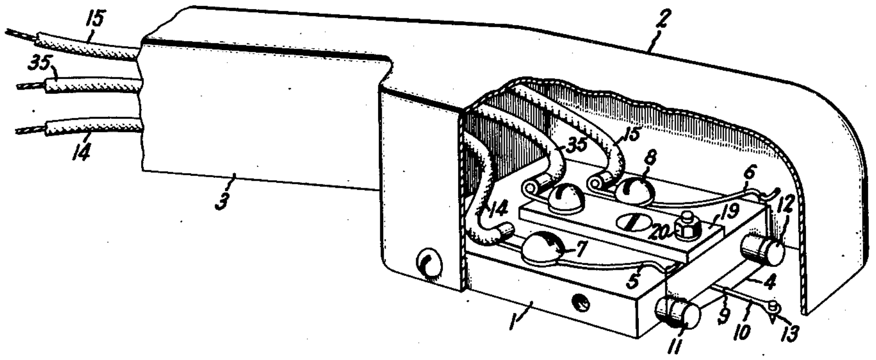

Referring now to the drawing, the pickup illustrated in Fig. 1 comprises a head or block 1 supported in a housing 2 at the end of a tone arm 3. The pickup illustrated is of the type disclosed and claimed in a copending application of William S. Bachman Serial No. 565,537, filed November 28, 1944, now Patent No. 2,491,794, granted December 20, 1949, and assigned to the same assignee as the present invention. This pickup is of the variable resistance type and employs a high resistance wire 4 having its ends connected to spring arms 5 and 6 which are secured to the head 1 by screws 7 and 8 respectively. The wire 4 is attached at its mid-point, indicated at 9, to a resilient electrically conducting stylus arm 10 and the portions of the wire 4 on either side of the arm 10 are wrapped once about snubbing posts 11 and 12. The action of the resistance wire is such that if the stylus arm 10 is moved slowly, the springs 5 and 6 will allow the wire to move around the posts 11 and 12. However, if the arm is moved quickly or vibrated at high frequency, the snubbers 11 and 12 will hold the wire and it will be stressed by movement of the stylus arm, the portions of the wire on the two sides of the arm being stressed simultaneously in opposite directions so that the tension on one is increased and that on the other decreased. Thus, if a stylus point 13 provided at the end of the arm 10 is vibrated by engagement with the sound groove of a moving phonograph record, the resistance of the two portions of the wire 4 will be varied equally and oppositely in accordance with the recorded sounds. This variation in resistance is utilized to vary the current in an electronic amplifier circuit so that the recorded sounds may be reproduced by a loud-speaker in the usual manner.

Figure 2:
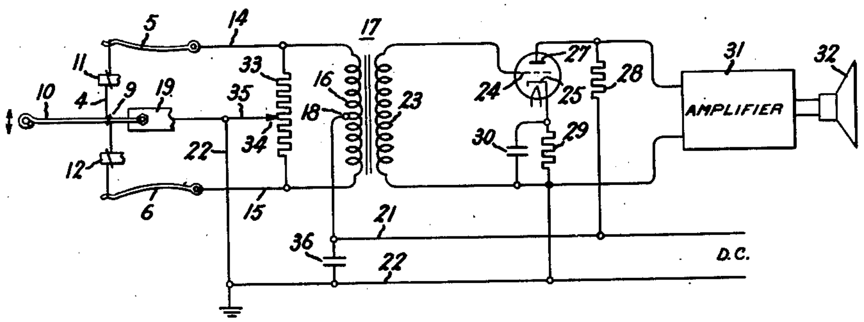

The arrangement for connecting the resistance wire 4 in an amplifier circuit is shown in Fig. 2. The arms 5 and 6 are connected by leads 14 and 15 to a primary winding 16 of a transformer 17. The winding 16 is provided with a center tap 18. The mid-point 9 of the resistance wire 4, which is connected to the stylus arm 10, is in electrical contact therewith and the stylus arm is electrically connected to a conducting strap 19 by a bolt 20 which passes vertically through the head 1.

In order to supply direct current to the resistance 4 so that variations of the current will be produced by the changes of resistance upon vibration of the stylus, the direct current source (not shown) is connected through lines 21 and 22 to the mid-point 18 of the winding 16 and to the strap 19. It will thus be apparent that direct current flows through the two portions of the winding 16 and the two portions of the reisistance wire 4, each in series with a corresponding one of the portions of the primary winding. Variations in the resistance of the two portions of the wire 4 which are equal and opposite thus produce equal and opposite changes of current through the two portions of the winding 16, the flux produced by the winding being a resultant value. The transformer 17 includes a secondary winding 23 and the variations of current through the primary winding 16 are reproduced as a resultant current in the secondary winding 23 and are impressed between a control electrode 24 and a cathode 25 of an electron discharge device 26. The anode of the device, as indicated at 27, is connected to the direct current source through a resistance 28, and the cathode-to-anode circuit is completed by a biasing resistor 29 and by-pass capacitor 30 connected in parallel between the direct current source and the cathode 25. The output of the electron discharge device 26 is supplied to a suitable amplifier 31 which energizes a loudspeaker 32 in the usual manner.

The direct current supply, which is obtained by rectifying alternating current, unavoidably contains an alternating component or ripple voltage unless an abnormally large filter system is employed. It is desirable, however, to avoid the expense of such filter system and the space required. However, if there is any resistance unbalance in the circuit including the two portions of the resistance wire 4 and the two portions of the winding 16, a ripple voltage component will be produced in the circuit and will appear at the output as a hum. Resistance unbalance in amplifying circuits, such as that illustrated, is difficult to avoid in production. However, if the currents flowing in the two leads 14 and 15 can be adjusted, alternating current ripple components across the two halves of the primary winding can be balanced out. In order to accomplish this balancing, I have provided a resistance 33 connected across the terminals of the winding 16 and a variable tap 24 at the mid-point of the resistance 33 connected to the strap 19 by a lead 35. Thus, the tap 34 is connected to the common point between the two portions of resistance 4.

By adjusting the tap 34, the hum component may be balanced out so that it is not necessary to employ a large filter circuit including the usual resistance and capacity components and a single small capacitor 36 may be employed across the direct current source.

After the resistance 33 has been adjusted by selecting the correct position of the tap 34, the circuit will operate throughout its normal range of operation without reproduction of hum due to the A.-C. component of the direct current supply.

From the foregoing it is readily apparent that I have provided a simple and effective arrangement for eliminating hum due to alternating current ripple in the direct current supply system and that this arrangement avoids the necessity of employing expensive and space-occupying filters.

What I claim as new and desire to secure by Letters Patent of the United States is:

1. In a sound reproducing apparatus or the like, a pair of resistance elements connected in series, means for varying the resistances of said elements simultaneously in opposite directions, an alternating current transformer having a primary winding connected in series with said resistances, a source of direct current having undesired variations due to alternating hum or ripple components, means for connecting the terminals of said source between a point on said primary winding intermediate the ends thereof and the common connection between said elements, a resistance connected across said primary winding, and adjustable means for connecting said common connection to said resistance intermediate the ends thereof, whereby the values of current in the two portions of said primary winding may be equalized to cancel the effects of said undesired variations in the current flowing from the direct current source.

2. In a sound reproducing apparatus or the like, a pair of resistance elements connected in series, means including a stylus member for varying the resistances of said elements simultaneously in opposite directions, an alternating current transformer having a primary winding connected in series with said resistances, said primary winding having a center tap, a source of direct current having undesired variations due to alternating hum or ripple components, means for connecting the terminals of said source between said center tap and the common connection between said resistance elements, a resistance connected across said primary winding, and means including an adjustable midtap on said resistance for connecting said common connection to said resistance, whereby the values of current in the two portions of said primary winding may be equalized to cancel the effects of said undesired variations in the current flowing from the direct current source.

CARROLL R. MINER.

REFERENCES CITED

The following references are of record in the file of this patent:

UNITED STATES PATENTS

| Number | Name | Date |
|---|---|---|
| 1,432,022 | Heising | Oct. 17, 1922 |
| 1,917,728 | Miessner | July 11, 1933 |
| 2,373,676 | Germeshausen | Apr. 17, 1945 |
| 2,380,514 | Germeshausen | July 31, 1945 |